United States Patent
Vadasz (10) Patent No.: US 10,161,395 B2
(45) Date of Patent: Dec. 25, 2018

(54) MECHANICALLY ACTUATED TRAVELING VALVE

(71) Applicant: Amnon Vadasz, San Antonio de Los Altos (VE)

(72) Inventor: Amnon Vadasz, San Antonio de Los Altos (VE)

(73) Assignee: MAXFLU PUMPS CORP., Calgary (CA)

( * ) Notice: Subject to any disclaimer, the term of this patent is extended or adjusted under 35 U.S.C. 154(b) by 380 days.

(21) Appl. No.: 14/494,882

(22) Filed: Sep. 24, 2014

(65) Prior Publication Data

US 2016/0084049 A1 Mar. 24, 2016

Related U.S. Application Data

(60) Provisional application No. 62/054,266, filed on Sep. 23, 2014.

(51) Int. Cl.
| | |
|---|---|
| *F04B 53/12* | (2006.01) |
| *F16K 31/60* | (2006.01) |
| *F16K 1/36* | (2006.01) |
| *F16K 1/42* | (2006.01) |
| *E21B 43/12* | (2006.01) |
| *F04B 15/02* | (2006.01) |
| *F04B 47/00* | (2006.01) |
| *F04B 53/10* | (2006.01) |
| *F16K 1/12* | (2006.01) |
| *F16K 1/52* | (2006.01) |
| *F16K 1/54* | (2006.01) |
| *F16K 1/44* | (2006.01) |

(52) U.S. Cl.
CPC ............ *F04B 53/128* (2013.01); *E21B 43/12* (2013.01); *F04B 15/02* (2013.01); *F04B 47/00* (2013.01); *F04B 53/10* (2013.01); *F04B 53/125* (2013.01); *F16K 1/12* (2013.01); *F16K 1/36* (2013.01); *F16K 1/42* (2013.01); *F16K 1/44* (2013.01); *F16K 1/52* (2013.01); *F16K 1/54* (2013.01)

(58) Field of Classification Search
CPC ........ F04B 53/128; F04B 53/122; F16K 1/36; F16K 1/42; F16K 31/60; F16K 15/00; F16K 15/063
USPC ............................ 417/555.1, 259; 137/512.1
See application file for complete search history.

(56) References Cited

U.S. PATENT DOCUMENTS

| | | | | |
|---|---|---|---|---|
| 1,497,541 | A | * 6/1924 | Camblin | F04B 53/143 417/451 |
| 4,531,896 | A | * 7/1985 | Spears | F01L 21/04 137/614.2 |
| 4,591,315 | A | * 5/1986 | Vadasz Fekete | F04B 53/122 417/259 |
| 4,591,316 | A | 5/1986 | Vadasz Fekete | |
| 4,708,597 | A | 11/1987 | Fekete | |

(Continued)

*Primary Examiner* — Dominick L Plakkoottam
*Assistant Examiner* — Connor Tremarche
(74) *Attorney, Agent, or Firm* — Marsh Fischmann & Breyfogle LLP; Jonathon A. Szumny (57) ABSTRACT

A mechanically actuated traveling valve for use in fluid pumping equipment. More particularly, a multiple component mechanically actuated traveling plug valve having a valve seat, a valve plug and at least one displaceable valve ring positioned therebetween is provided for use in subsurface positive displacement pumps capable of pumping high viscosity fluids, with any gas to liquid ratio, operating at any inclination angle.

15 Claims, 6 Drawing Sheets

(56) References Cited

U.S. PATENT DOCUMENTS

| | | | |
|---|---|---|---|
| 4,740,141 A * | 4/1988 | Fekete | F04B 53/122 |
| | | | 417/259 |
| 5,044,395 A * | 9/1991 | Vadasz F. | F16K 15/00 |
| | | | 137/512.1 |
| 5,048,604 A | 9/1991 | Vadasz F. et al. | |
| 5,176,171 A * | 1/1993 | Andersson | F16K 15/063 |
| | | | 137/512.1 |

\* cited by examiner

MECHANICALLY ACTUATED TRAVELING VALVE

CROSS REFERENCE TO RELATED APPLICATION

This application claims priority from U.S. Provisional Patent Application No. 62/054,266, entitled "MECHANICALLY ACTUATED TRAVELING VALVE," and filed on Sep. 23, 2014, the entire contents of which is incorporated herein in its entirety.

TECHNICAL FIELD

A mechanically actuated traveling valve for use in fluid pumping equipment is provided. More particularly, a multiple component traveling plug valve is provided for use in subsurface positive displacement pumps capable of pumping high viscosity fluids, with any gas to liquid ratio, operating at any inclination angle.

BACKGROUND

In the oil industry, various types of subsurface pumps are used for extracting crude oil from the reservoir to the surface. Among conventional artificial lift systems, the most prevalent type are mechanically driven subsurface pumps activated by means of a sucker rod string from the surface via beam pumping or other pumping units. Such pumps are capable of handling very high reservoir temperatures resulting from advanced recovery techniques (e.g., the injection of steam or in-situ combustion to lower the viscosity of the heavy and extra heavy crude oil). Due to the limited diameter of mechanical subsurface pumps and the number of strokes per unit of time at which they can operate, it is essential to achieve maximum volumetric efficiency at each pump stroke.

In mechanically actuated positive displacement subsurface pumps, the valve attached to the component that induces reciprocating motion is known as the traveling valve; while, the valve attached to the stationary component is known as the standing valve. The traveling and standing valves are basically retention valves arranged so that both allow fluid flow in the same direction. Consequently, the relative motion between these two valves produces the pumping action.

Mechanical pumps can be configured such that valve elements act as a plug and a seat, where fluid flows in one direction when the plug becomes separated from the seat by the pressure differential at both sides of the valve. The plug and seat may have any shape; provided that there must be a hermetic seal between them, in order to prevent reverse flow, when the valve is closed. Currently, the most commonly used configuration in the oil industry for the plug is a ball or sphere referred to as a "ball and seat" valve.

In order to allow interchangeability between manufacturers, the American Petroleum Institute (API) established the Standard API 11AX, which standardizes threads and tolerances of valve elements, but does not take into account the design nor the flow areas through the various components of subsurface pumps.

When pumping crudes with high gas to oil ratio, conventional subsurface pumps with ball and seat valves are somewhat inefficient. Due to pressure drops that occur between the traveling and standing valves within the subsurface pump in the suction phase, part of the gas separates from the oil and creates a gas chamber between the traveling valve and the oil flowing across the standing valve. Since both valves require a pressure differential for the ball to separate from the seat, it is necessary to compress the gas during the discharge phase until the gas pressure inside the pump cylinder exceeds the pressure of the fluid column downstream the traveling valve. In most cases, the mobile component can plummet the oil causing a strong fluid pound effect, harming the pump and decreasing its lifespan. Attempts have been made to overcome this problem, including affixing an annular valve to the discharge end of the cylinder to support the counter pressure generated by the weight of the oil column, significantly reducing the pressure differential required to open the traveling valve by the gas trapped between the traveling valve and the liquid phase of the crude oil and increasing, to some extent, the volumetric efficiency of the pump.

Attempts have also been made to address the low volumetric efficiency when pumping fluids with high gas to oil ratio. For example, valves having a single plug and seat have been developed where the plug (directly connected to the sucker rod string through a rod) is forced to move with a reciprocating motion induced from the surface by a beam or other pumping unit, while the plunger moves freely between the plug and a stop. In this case, the plunger can have a seat attached to it, such that whenever the plug contacts the seat, a seal is formed, and when they separate the fluid is able to flow. In such systems, the plug can be separated from the seat due to: (i) the weight of the sucker rod string which acts directly on the plug, (ii) the pressure differential between the suction side and the discharge side of the traveling valve, and (iii) the friction between the plunger and the pump barrel acting on the moveable component. Such valves can open much faster and are more efficient than ball and seat valves (including subsurface pumps with annular valve); however, annular valves could also be implemented were high gas to oil ratios exist.

Many configurations of pumps having single plug and seat traveling valves exist, including the VR-S™ disclosed in U.S. Pat. Nos. 4,591,316, 4,708,597 and 5,048,604, Canada Patent No. 1,221,875, and the LOCK-NO plunger manufactured by the HARBISSON FISHER Company. U.S. Pat. No. 5,044,395 teaches the implementation of a plug, a seat, and one or several seating rings operable as a check valve that offers minimum pressure drop and the maximum possible flow area in a confined cylindrical space. In such valves, the fluid passes in one direction when the intake end of the plug separates from the discharge end of the first ring, while the intake end of the same ring separates from the discharge end of the subsequent ring or rings, depending if there is more than one ring. If there is more than one ring, the fluid is not allowed to return when the intake end of the plug seals against the discharge end of the first ring, while the intake end of the same ring seals against the discharge end of the second ring, and so on, until the intake end of the last ring seals against the discharge end of the seat. As such, the standing valve using one or more rings between the plug and the seat, and the resulting incremented flow area, enables the valve to handle higher viscosity fluids.

U.S. Pat. Nos. 4,591,315 and 4,740,141 teach composite retention valves located specifically at the intake of the plunger, which opens and closes mechanically for the single plug and seat retention valves, but with much greater flow areas. These composite retention valves have the seat attached to the suction end of the plunger, while the rings and the reciprocally actuated plug (by means of a rod that ran across the plunger) are altogether outside said plunger.

Such single plug and composite retention valves require that the traveling valves, rather than the plunger, plunge into to the liquid phase of the fluid within the pump chamber. However, if the intake end of the plunger contacted the fluid before the traveling valve, then the drag force acting on the plunger could aid in an earlier opening of the valve and at the same time extend its useful life, since the fluid pound would be on the plunger and not on the sealing elements of the valve.

Conventional pumps have been somewhat successful to meet the pumping requirements of fluids with high gas to oil ratio, produced in vertical or slightly deviated wells; however, known pump designs can become somewhat inefficient when pumping oil of: (a) very high viscosity, (b) medium or high viscosity with steam due to the injection of steam into the well or adjacent wells to lower the viscosity of heavy and extra heavy crude oil, (c) any viscosity particularly with high gas to oil ratio, or (d) any viscosity in horizontal or highly deviated wells.

There is a need for valve design for increasing the performance of mechanically actuated positive displacement subsurface pumps, the valve being capable of significantly reducing oil seepage and being able to pump a greater amount of fluid. Such a valve may comprise plug and seat sealing elements, where the sealing elements may comprise at least one annular sealing element positioned between the plug and sealing elements. Such a configuration may provide for a considerable increase in the valve flow area.

SUMMARY OF THE INVENTION

Pumping crudes of high viscosity using conventional mechanical positive displacement pumps can be inefficient due to the low pumping rate imparted on the pumping system as a direct consequence of flow area restrictions across pump valves, a problem that is further aggravated where gas and/or steam are present in the fluid being pumped. Moreover, if the pump must work at any significant deviation angle from the vertical, the pumping efficiency can also be affected by the increased seepage of fluid across the sealing elements of both standing and traveling valves.

In this regard, a mechanically actuated traveling valve is provided having a plug, a seat, and at least one or more displaceable valve rings. According to embodiments herein, intermittently at each valve during the suction and discharge phases, the plug can form a seal against a first displaceable ring adjacent thereto, each ring can form a seal against the next ring adjacent thereto (e.g., where more than one ring is provided in series), where the other end of the ring or the last ring in series can form a seal against the seat. In this arrangement, the sum of the annular flow area outside each ring plus the flow area inside the same ring may be substantially similar to the entire flow area of the seat. The present valve configuration can permit a substantial flow area increment across the fluid passages of both standing and traveling valves, permit a larger number of strokes per unit of time, and consequently increase the amount of fluid that can be pumped in the same time period.

The present traveling valve can be located within the moveable (e.g., reciprocating) component of the pump. In such embodiments, the valve can comprise a reciprocating valve stem having a first end and a second end, and having an outer periphery, valve stem reciprocating means connected to the stem by a valve connector for imparting reciprocating movement from the reciprocating means to the stem, a valve seat secured within the housing, the seat having an inner periphery, where the inner periphery of the seat and the outer periphery of the stem defining a first fluid flow area, a valve plug connected to the stem at its second end, the plug having an outer periphery, where the outer periphery and the housing defining a second annular fluid flow area, and at least one displaceable valve ring having an internal and external diameter, the internal diameter of the ring(s) and the outer periphery of the stem defining a third fluid flow area, and the external diameter of the ring(s) and the housing defining a fourth fluid flow area, wherein the size or capacity of the first fluid flow area is substantially equal to that of the second fluid flow area, and substantially equal to the sum of the third and fourth fluid flow areas. Reciprocating movement of the stem opens and closes the valve. As such, the valve will open primarily due to the force exerted thereon by the stem, in addition to any pressure differential across the valve and the friction between the plunger and the pump cylinder, enabling the gas of highly gaseous fluids to be handled more adequately. Further, because the reciprocating movement of the stem opens and closes the valve, it is contemplated that the present valve (and pump) can operate efficiently at any inclination angle.

Other objects, advantages and features of the present invention will become clear from the following detailed description of the invention when read in conjunction with the drawings and appended claims.

DESCRIPTION OF THE EMBODIMENTS

Mechanically actuated positive displacement pumps or compressors can comprise at least one traveling and one standing valve. Traveling valves can be positioned within the reciprocally moving portion of such pumps or compressors (e.g. along the pump plunger or cylinder). According to embodiments herein, the present mechanically actuated traveling valve can be located anywhere within the length of the plunger, when said plunger is the moveable component or within the discharge end of the pump cylinder, when said cylinder is the moveable component. Although reference herein is made to mechanically actuated subsurface pumps used in the oil industry, embodiments of the present system can be operable with any other positive displacement pump or compressor.

More specifically, the present mechanically actuated traveling valve may be fixedly attached within the moveable component of the positive displacement subsurface pump, resulting in two possibilities: Case A, in which the plunger is the moveable component and the pump cylinder or barrel (according to Standard API 11AX nomenclature) is the stationary component, and Case B, in which the barrel is the moveable component, and the plunger is the stationary component. The present mechanically actuated traveling valve can be implemented in positive displacement subsurface pumps and can operate at any deviation angle.

Figure 1:
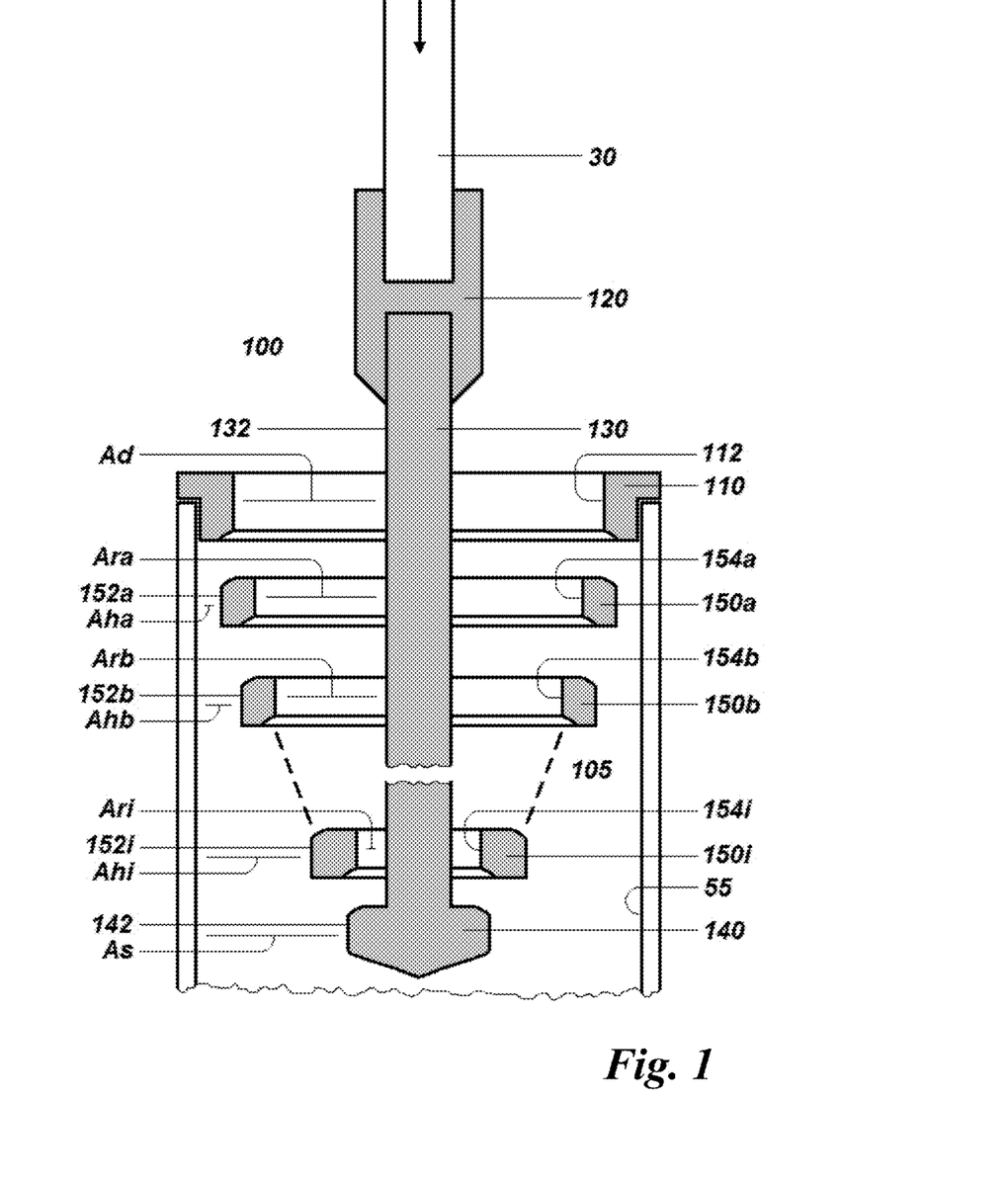
FIG. 1 is a longitudinal sectional view through the mechanically actuated traveling valve according to embodiments herein, the valve being in the "open" position.
Figure 2:
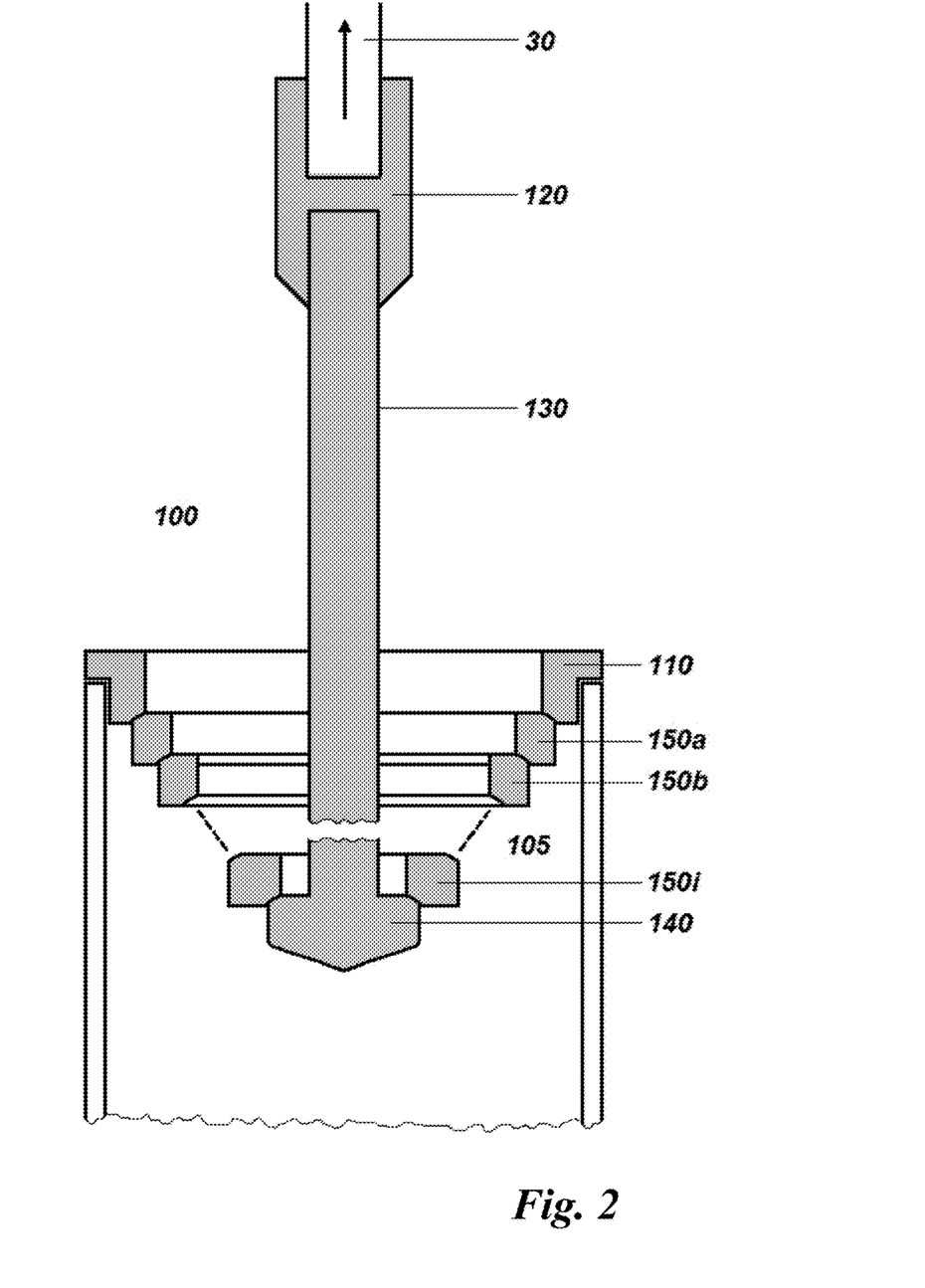
FIG. 2 is a longitudinal sectional view through the mechanically actuated traveling valve according to embodiments herein, the valve being in the "closed" position.

Having regard to FIGS. 1 and 2, a mechanically actuated traveling valve 100 for providing an increased flow area and minimum pressure drop is provided, in open position (FIG. 1), and in the closed position (FIG. 2). Valve 100 comprises valve seat 110, valve connector 120, valve stem 130, valve plug 140, first hollow valve ring 150a, second hollow valve ring 150b and the i-th or last hollow valve ring 150i. The valve is housed at the discharge end of both plunger 50 for Case A and barrel 60 for Case B. Valve plug 140 can be part of or be attached by any means to valve stem 130 which at the same time is attached by any means to valve connector 120. In embodiments herein, between valve plug 140 and valve seat 110 there is a plurality of hollow valve rings 150a, 150b, . . . , 150i. These hollow valve rings are limited by any means to open to a specific distance from one another and contact each other through their sealing surfaces when closed. The farthest position of valve plug 140 from valve seat 110, defines the traveling valve chamber 105.

Valve connector 120 serves to induce the reciprocal motion from the reciprocating motion inducing element 30 (e.g., in the oil industry, the last sucker rod or the rod valve) to valve stem 130. Valve connector 120, valve plug 140 and hollow valve rings 150a, 150b, . . . , 150i can be guided by any means in order to assure that when traveling valve 100 is closed, the sealing surfaces of valve seat 110 and the plurality of hollow valve rings 150a, 150b, . . . , 150i seal against each other and the ith or last hollow valve ring 150i seals against valve plug 140.

In embodiments herein, valve 100 can be configured to minimize pressure drop and maximize flow area across the valve 100. This can be accomplished by arranging annular flow area Ad, defined by the inner peripheral surface 112 of valve seat 110 and the outer peripheral surface 132 of valve stem 130, to be substantially equal to or smaller than annular flow area As defined by the outer peripheral surface 142 of valve plug 140 and the inner peripheral surface 55 of plunger 50 in Case A or of barrel 60 in Case B. Further, this can be accomplished by arranging that for each of the hollow valve rings 150a, 150b, . . . , 150i, the sum of their external annular flow area Ahj (where j=a, b, i) defined by the outer peripheral surface 152a, 152b, . . . , 152i of each hollow valve ring 150a, 150b, . . . , 150i and the inner peripheral surface 55 of plunger 50 in Case A or of barrel 60 in Case B, plus their internal annular flow area Arj (where j=a, b, i) defined by the outer peripheral surface 132 of valve stem 130 and the inner peripheral surface 154a, 154b, . . . , 154i of each hollow valve ring 150a, 150b, . . . , 150i, be substantially equal to annular flow area Ad for first valve ring 150a, and substantially equal to or greater than annular flow area Ad for subsequent rings 150b, . . . 150i). This enables the number of hollow valve rings to be determined, since if more rings are used, the inner diameter 112 of valve seat 110 will increase and at the same time the outer diameter 142 of valve plug 140 will decrease. It should be understood that the additional flow area attained with the addition of another hollow valve ring may only provide a slight increase in annular flow area Ad within valve seat 110. Since the first hollow valve ring provides the most significant flow area increment with respect to other traveling valves that use only one sealing element, subsurface pump sizes commonly used in the oil industry may utilize at least one hollow valve ring.

As can readily be seen in FIG. 1, when a plurality of hollow valve rings 150a, 150b, . . . , 150i are employed, they can be disposed in series between valve plug 140 and valve seat 110 and the internal annular flow area Arj (where j=a, b, . . . , i) of each hollow valve ring decreases while the external annular area Ahj (where j=a, b, . . . , i) of each hollow valve ring increases as the hollow valve rings progress from valve seat 110 toward valve plug 140. In addition, with particular reference to FIG. 2, it can be seen that when the valve is in closed position, the discharge end of the first hollow valve ring 150a seats on the intake end of valve seat 110 in a sealing manner, while the discharge end of the second hollow valve ring 150b seats in a sealing manner on the intake end of the first hollow valve ring 150a, and so on until the discharge end of valve plug 140 seats in a sealing manner on the intake end of the ith or last hollow valve ring 150i. The foregoing is accomplished because the outside diameter of the first hollow valve ring 150a should be greater than the inside diameter of valve seat 110, while the outside diameter of the second hollow valve ring 150b should be greater than the inside diameter of the first hollow valve ring 150a, and so on until valve plug 140, where the outside diameter of said valve plug 140 should be greater than the inside diameter of the ith or last hollow valve ring 150i. A preferred sealing surface of the components herein corresponds to a spherical zone, allowing for slight angular misalignment without breaking up the seal; however, it should be understood that the sealing surfaces might have any other configuration, provided that when two sealing elements are in contact with each other, a perfect seal is maintained. This insures that the pressure drop across the traveling valve is minimized and the flow through the valve body is maximized.

The minimum distance at which one hollow valve ring separates from the next one when the mechanically actuated traveling valve 100 is in its open position is established by the internal annular flow area Ark (where k=a, b, . . . , m, and m is the hollow valve ring next to the ith or last hollow valve ring 150i) of the largest of the two hollow valve rings; in the sense that the flow area at the opening between the hollow valve rings be equal or greater than said internal annular flow area Ark (where k=a, b, . . . , m, and m is the hollow valve ring next to the ith or last hollow valve ring 150i) of the largest of the two hollow valve rings.

The minimum distance at which valve seat 110 separates from the first hollow valve ring 150a when the mechanically actuated traveling valve 100 is in its open position is established by the internal annular flow area Ad of valve seat 110 and the internal annular flow area Ara of the first hollow valve ring 150a; in the sense that the flow area at the opening between valve seat 110 and hollow valve ring 150a be equal or greater than the internal annular flow area Ad of valve seat 110 minus the internal annular flow area Ara of the first hollow valve ring 150a.

The minimum distance at which valve plug 140 separates from the ith or last hollow valve ring 150i when the mechanically actuated traveling valve 100 is in its open position is established by the internal annular flow area Ari of hollow valve ring 150i; in the sense that the flow area at the opening between valve plug 140 and the ith or last hollow valve ring 150i be equal or greater than the internal annular flow area Ari of the ith or last hollow valve ring 150i.

In order to maximize pumping efficiency, the surfaces of valve plug 140, hollow valve rings 150a, 150b, . . . , 150i, and valve seat 110 which will be contacted by the flowing fluid, should be as smooth as possible so as to reduce drag and thereby reduce the pressure drop which may occur as the fluid passes over these surfaces.

Since the traveling valve 100 operates mainly mechanically (that is, it will open and close in a forced manner), the valve can be positioned anywhere within the entire length of plunger 50. A preferred positioning of the mechanically actuated traveling valve 100 in Case A can be at the discharge end of plunger 50; while for case B, the location of said mechanically actuated traveling valve 100 can only be at the discharge end of the moveable barrel 60.

By providing a mechanically actuated, multiple component traveling valve, pressure drop across the valve can be minimized and flow area can be maximized, thus maximizing flow through the valve thereby maximizing pumping efficiency and prohibiting the phenomena of gas lock and/or steam lock.

The mechanically actuated traveling valve object of this invention that offers the greatest flow area and minimum pressure drop for the moving component, when used with any currently available standing valve, will improve significantly the pump's performance; however, when used in conjunction with the standing valve that offers the greatest flow area and minimum pressure drop for the stationary component, as described in U.S. Pat. No. 5,044,395 by the author of this invention, the most efficient positive displacement subsurface pump will be produced.

Figure 3:
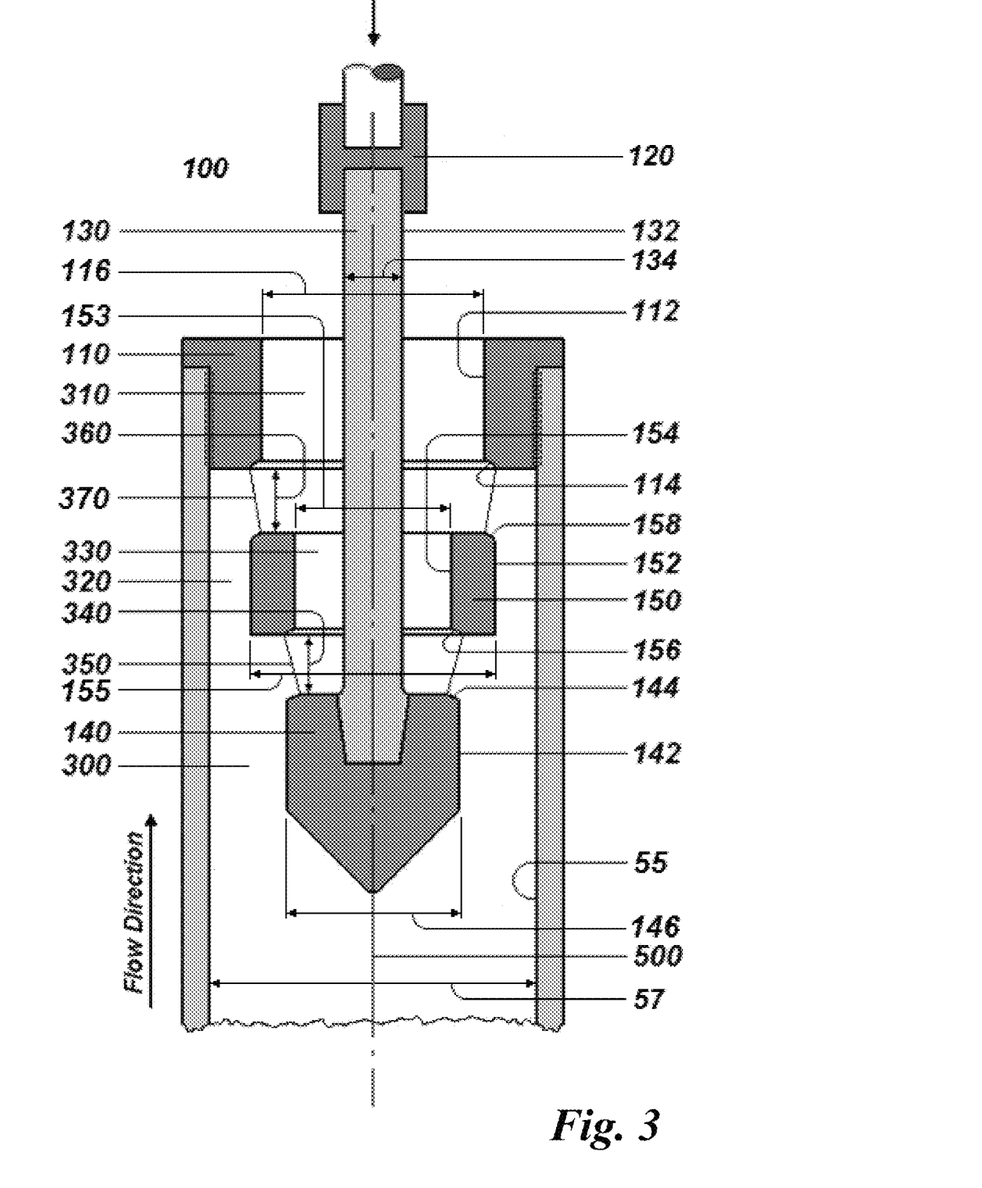
FIG. 3 is a longitudinal sectional view of the mechanically actuated traveling valve used in a positive displacement subsurface pump showing an embodiment having one ring.

Having regard to FIG. 3, the mechanically actuated traveling valve 100 can be fixedly attached by any means to the moveable element. In such embodiments of the valve 100 can comprise valve seat 110, a single hollow valve ring 150, valve plug 140, valve stem 130 and valve connector 120, each having a collinear axis and moving along the subsurface pump's longitudinal axis 500 where hollow valve ring 150 moves between valve plug 140 and valve seat 110.

Valve 100 can comprise an annular flow area 300 around valve plug 140 that can be determined by the inner peripheral surface 55 of plunger 50 in Case A or barrel 60 in Case B and the outer peripheral surface 142 of valve plug 140. The annular flow area 310 at valve seat 110 is determined by the inner peripheral surface 112 of valve seat 110 and the outer peripheral surface 132 of valve stem 130. Since the annular flow area 300 around valve plug 140 must be substantially equal to the annular flow area 310 within valve seat 110, the internal diameter of valve seat 110 and the external diameter of valve plug 140 can be determined for a specified outer diameter 134 of valve stem 130 and a specified inner diameter 57 of plunger 50 in Case A or barrel 60 in Case B. The outer diameter 134 of valve stem 130 will depend on the yield strength of the selected material plus whatever safety factor is considered appropriate. The inner diameter 57 of plunger 50 for Case A or of barrel 60 for Case B can be established by the plunger and barrel manufacturers and/or standards known by those skilled in the art.

The outer annular flow area 320 of hollow valve ring 150 can be determined by the inner peripheral surface 55 and the outer peripheral surface 152 of hollow valve ring 150. The inner annular flow area 330 of hollow valve ring 150 is determined by the inner peripheral surface 154 of hollow valve ring 150 and the outer peripheral surface 132 of valve stem 130. The sum of the outer annular flow area 320 of hollow valve ring 150 plus the inner annular flow area 330 of the same hollow valve ring 150 can be substantially equal to the annular flow area 300 around valve plug 140. This establishes both the outer and inner diameter of hollow valve ring 150, taking into consideration the overlap that exists between: (i) the outer diameter 155 of hollow valve ring 150 and the inner diameter 116 of valve seat 110, such that when the valve is closed both contacting surfaces 158 of hollow valve ring 150 and 114 of valve seat 110 make a perfect seal, and (ii) the outer diameter 146 of valve plug 140 and the inner diameter 153 of hollow valve ring 150, such that when the valve is closed both contacting surfaces 144 of valve plug 140 and 156 of hollow valve ring 150 also create a seal. The contacting surfaces 158 of hollow valve ring 150 and 114 of valve seat 110, as well as the contacting surfaces 144 of valve plug 140 and 156 of hollow valve ring 150, correspond to spherical segments, ensuring that any slight angular misalignment between the sealing elements will maintain a seal.

The inner annular flow area 330 or Ai of hollow valve ring 150 determines the minimum separation distance 340 or Hp between the intake end of hollow valve ring 150 and the discharge end of valve plug 140. This minimum separation distance 340 can be determined from the conical surface 350 that is generated between the overlap of sealing surface 156 of hollow valve ring 150 and sealing surface 144 of valve plug 140. The large diameter Dp of conical surface 350 corresponds to the outer diameter 146 of valve plug 140, while the minor diameter Di of this same conical surface 350 corresponds to the inner diameter 153 of hollow valve ring 150. Once these parameters are established, the minimum separation distance 340 or Hp can be determined from Equation 1:

$$Hp = \sqrt{\left(\frac{4Ai^2}{\pi^2(Dp+Di)^2} - \frac{(Dp+Di)^2}{4}\right)} \quad \text{(Eq. 1)}$$

Thus, the separation distance 340 or Hp calculated in Equation 1 must be greater than or equal to the minimal distance attained with the above relationship.

The annular flow area 310 or As of valve seat 110 minus the inner annular flow area 330 or Ai of hollow valve ring 150 determine the minimum separation distance 360 or Hs between the intake end of valve seat 110 and the discharge end of hollow valve ring 150. This minimum separation distance 360 can be determined from the conical surface 370 that is generated between the overlap of sealing surface 158 of hollow valve ring 150 and sealing surface 114 of valve seat 110. The large diameter Ds of conical surface 370 corresponds to the outer diameter 155 of seat 150, while the minor diameter Do of this same conical surface 370 corresponds to the inner diameter 116 of valve seat 110. Once these parameters are established, the minimum separation distance 360 or Hs can be determined from Equation 2:

$$Hs = \sqrt{\left(\frac{4(As-Ai)^2}{\pi^2(Ds+Do)^2} - \frac{(Ds-Do)^2}{4}\right)} \quad \text{(Eq. 2)}$$

Thus, the separation distance 360 or Hs calculated in Equation 2 is greater than or equal to the minimal distance attained with the above relationship.

Figure 4:
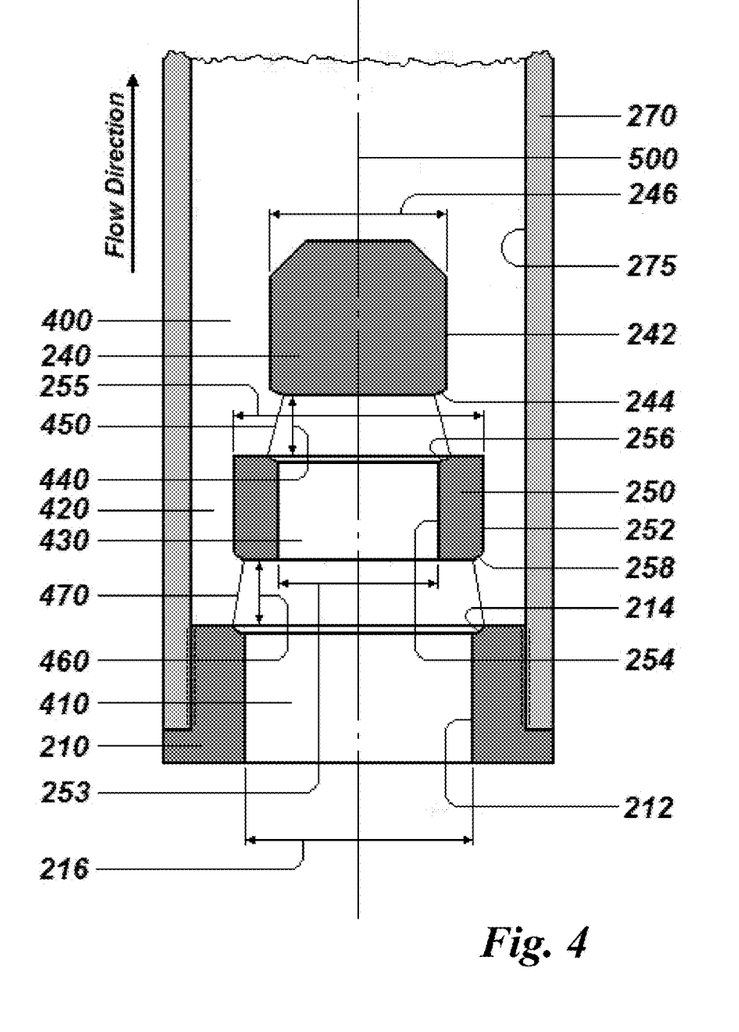
FIG. 4 is a longitudinal sectional view of the standing valve used in a positive displacement subsurface pump showing an embodiment having one ring.

FIG. 4 shows the standing valve 200 used in one embodiment of a subsurface pump. Valve 200 can be fixedly attached by any means to the stationary component of the subsurface pump, for e.g., a standing valve body 270, said body being a separate component or simply the internal diameter of barrel 60 of the subsurface pump. For explanation purposes, it is shown as a separate component. Valve 200 can comprise a valve seat 210, a single hollow valve ring 250 and a valve plug 240, each having collinear axis and moving along the subsurface pumps longitudinal axis 500, where hollow valve ring 250 moves between valve plug 240 and valve seat 210.

In standing valve 200, the annular flow area 400 around valve plug 240 can be determined by the inner peripheral surface 275 of standing valve body 270 and the outer peripheral surface 242 of valve plug 240. The circular flow area 410 at valve seat 210 is determined by the inner peripheral surface 212 of valve seat 210. Since the annular flow area 400 around valve plug 240 can be substantially equal to the annular flow area 410 within valve seat 210, the internal diameter of valve seat 210 and the external diameter of valve plug 240 can be determined for a specified standing valve body 270 inner diameter. The inner diameter of standing valve body 270 can depend on the yield strength of the selected material, and include any appropriate safety factor, which can be established by the standing valve or pump barrel manufacturers and/or standards known by those skilled in the art.

The outer annular flow area 420 of hollow valve ring 250 is determined by the inner peripheral surface 275 of standing valve body 270 and the outer peripheral surface 252 of hollow valve ring 250. The inner circular flow area 430 of hollow valve ring 250 is determined by the inner peripheral surface 254 of hollow valve ring 250. The sum of the outer annular flow area 420 of hollow valve ring 250 plus the inner circular flow area 430 of the same hollow valve ring 250 can be substantially equal to the annular flow area 400 around valve plug 240. This establishes both the outer diameter 255 and inner diameter 253 of hollow valve ring 250, taking into consideration the overlap that must exist between: (i) the outer diameter 255 of hollow valve ring 250 and the inner diameter 216 of valve seat 210, such that when the valve is closed both contacting surfaces 258 of hollow valve ring 250 and 214 of valve seat 210 make a perfect seal, and (ii) the outer diameter 255 of valve plug 240 and the inner diameter 253 of hollow valve ring 250, such that when the valve is closed both contacting surfaces 244 of valve plug 240 and 256 of hollow valve ring 250 also make a seal. The contacting surfaces 258 of hollow valve ring 250 and 214 of valve seat 210, as well as the contacting surfaces 244 of valve plug 240 and 256 of hollow valve ring 250, correspond to spherical segments, ensuring that any slight angular misalignment between the sealing elements will maintain a seal.

The inner circular flow area 430 or Ac of hollow valve ring 250 determines the minimum separation distance 440 or Hc between the discharge end of hollow valve ring 250 and the intake end of valve plug 240. This minimum separation distance 440 can be determined from the conical surface 450 that is generated between the overlap of sealing surface 256 of hollow valve ring 250 and the sealing surface 244 of valve plug 240. The large diameter Db of conical surface 450 corresponds to the outer diameter 246 of valve plug 240, while the minor diameter Dk of this same conical surface 450 corresponds to the inner diameter 253 of hollow valve ring 250. Once these parameters are established, the minimum separation distance 440 or Hc can be determined from Equation 3:

$$Hc = \sqrt{\left(\frac{4Ac^2}{\pi^2(Db+Dk)^2} - \frac{(Db+Dk)^2}{4}\right)} \quad \text{(Eq. 3)}$$

Thus, the separation distance 440 or Hc calculated in Equation 3 is greater than or equal to the minimal distance attained with the above relationship.

The circular flow area 410 or At of valve seat 210 minus the inner circular flow area 430 or Ac of hollow valve ring 250 determines the minimum separation distance 460 or Ht between the discharge end of valve seat 210 and the intake end of hollow valve ring 250. This minimum separation distance 460 can be determined from the conical surface 470 that is generated between the overlap of sealing surface 258 of hollow valve ring 250 and the sealing surface 214 of valve seat 210. The large diameter Dp of conical surface 470 corresponds to the outer diameter 255 of valve seat 250, while the minor diameter Dn of this same conical surface 470 corresponds to the inner diameter 216 of valve seat 210. Once these parameters are established, the minimum separation distance 460 or Ht can be determined from Equation 4:

$$Ht = \sqrt{\left(\frac{4(At-Ac)^2}{\pi^2(Dp+Dn)^2} - \frac{(Dp-Dn)^2}{4}\right)} \quad \text{(Eq. 4)}$$

Thus, the separation distance 460 or Ht calculated in Equation 4 is greater than or equal to the minimal distance attained with the above relationship.

For subsurface pumps assembled according to: (i) Case A, the mechanically actuated traveling valve 100 can be located at the discharge end of plunger 50; while standing valve 200 can be located at the intake end of barrel 60, and (ii) Case B, the mechanically actuated traveling valve 100 can be located at the discharge end of barrel 60; while standing valve 200 can be located at the discharge end of plunger 50.

Figure 5:
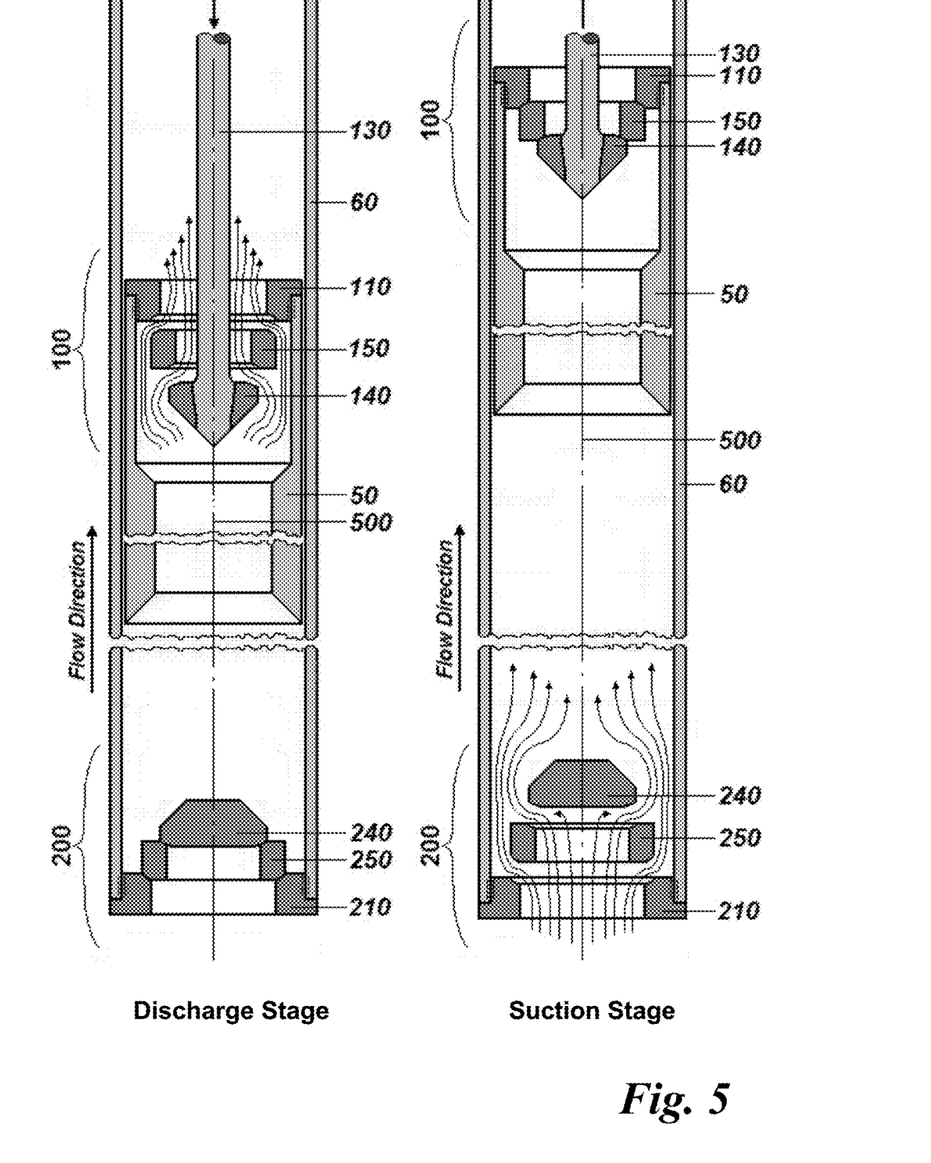
FIG. 5 is a longitudinal sectional view of a positive displacement subsurface pump having its valves in the open and closed position during "Discharge" and "Suction" stages where the plunger is the moveable component and the barrel is the stationary component.

For example, having regard to FIG. 5, one embodiment of a positive displacement subsurface pump for Case A is shown for both the open and closed position of the valves. Having regard to FIG. 6, an embodiment for Case B is shown for both the open and closed position of the valves. In both figures, the present mechanically actuated traveling valve 100 is shown having only one hollow valve ring and the standing valve 200 having only one hollow valve ring. It is understood that additional hollow valve rings can be included, but for explanatory purposes, only embodiments having a single hollow valve ring are depicted.

Figure 6:
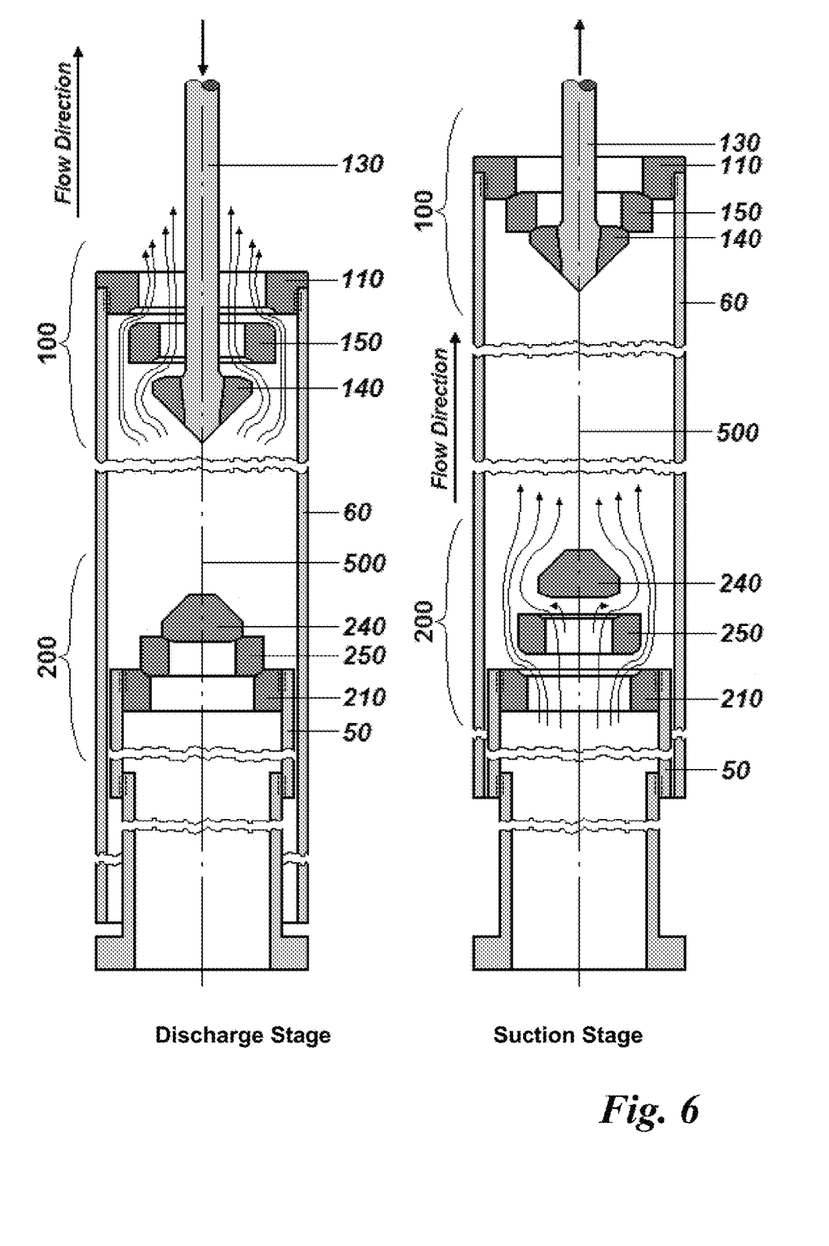
FIG. 6 is a longitudinal sectional view of a positive displacement subsurface pump having its valves in the open and closed position during "Discharge" and "Suction" stages where the barrel is the moveable component and the plunger is the stationary component.

In embodiments herein, the longitudinal axis of each individual component of mechanically actuated traveling valve 100 and standing valve 200 are collinear and move along the longitudinal axis 500 of the positive displacement subsurface pump. When the valves are open, there must be a minimum distance at which their respective hollow valve ring separates from their corresponding seat and another minimum distance at which their respective plug separates from the other side of the hollow valve ring. It is contemplated that any possible configurations and embodiments that comply with these concepts are considered, such as those in which the valve constituents are not collinear with the pump's longitudinal axis 500 when open or closed.

For both Cases A and B, the discharge end of valve connector 120 can be affixed to the reciprocating motion inducing element 30, which can either be the sucker rod or the rod valve (according to Standard API nomenclature) depending on the type of subsurface pump selected (whether rod, tubing or casing).

All the contacting sealing surfaces between the valve components can be specifically spherical zones, since this particular shape will maintain a seal even for slight angular misalignment between them; however it must be understood, that any other shape or configuration that can maintain a seal is also contemplated herein.

Embodiments of the present travelling valve can enable the reciprocating portion of a displacement pump to descend at a faster rate due to the reduction in the drag resistance to the motion caused by the increment in flow areas across said traveling valve. As such, the present valve can be used to handle high viscosity crude oil (particularly heavy and extra-heavy crudes), while permitting a higher number of strokes per unit time and improving the pump's performance.

Embodiments of the present traveling valve can provide a travelling valve having mechanically actuated (guided) sealing elements, reducing oil seepage across the valve, and because its operation is unaffected by the vertical component of the force of gravity, improving the overall performance of the pump at any deviation angle, particularly when used in highly deviated or horizontal wells.

Embodiments of the present traveling valve can operate mechanically and by pressure differential, thus opening in each stroke regardless of the fluid gas to oil ratio, improving the pump's volumetric efficiency.

In operation, a positive displacement pump for Case A is shown in FIG. 5, and for Case B in FIG. 6. In both cases, during the suction stage, mechanically actuated traveling valve 100 is closed and standing valve 200 is open; while at the discharge stage, mechanically actuated traveling valve 100 is open and standing valve 200 is closed. Accordingly, the present system aims to provide the following advantages:

1. By equating the flow areas across each of the components of the mechanically actuated traveling valve 100 a minimal pressure drop is attained; consequently the flow across the valve will maximized compared to single sealing element valves.

2. By placing the mechanically actuated traveling valve 100 at the discharge end of the moveable element, it can be implemented in pumps that have either: (i) the plunger 50 as the moveable component, or (ii) the barrel 60 as the moveable component, permitting the implementation of mechanically opening valves, of any sort, in pumps that have the barrel as the moveable component.

3. The contacting surfaces of each of the components of the mechanically actuated traveling valve 100 can have a spherical zone configuration, which assures a substantially perfect seal even when slight angular misalignment appears due to wear after lengthy operation.

4. Since traveling valve 100 operates mechanically, the gas that separates from the crude oil can be displaced in each stroke by the fluid that is downstream of the valve, thus avoiding gas or steam lock.

5. For the case when the plunger 50 is the moveable component, since the mechanically actuated traveling valve 100 is located at the discharge end of said plunger 50, the suction end of this plunger 50 will contact the fluid before the mechanically actuated traveling valve 100 does, thus allowing for the viscosity of the fluid to generate a drag force which aids in the earlier opening of the said traveling valve. Prior art did not have this advantage, since the traveling valve was specifically located outside the plunger at its suction end.

6. A positive displacement subsurface pump assembled with the mechanically actuated traveling valve 100 according to embodiments herein, together with any other standing valve, can operate more efficiently; however, when used with a standing valve 200, a maximum efficiency pump can be generated, since now both valves allow for minimal pressure drop and maximum fluid flow across the pump in each pump stroke, enabling an increase in the pumping rate, consequently incrementing the oil production.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A mechanically actuated traveling valve positioned within a positive displacement pump, the pump having a reciprocally moving plunger having an inner periphery forming a fluid chamber, an upstream suction end and a downstream discharge end, the valve comprising:

a reciprocating valve stem having a first end and a second end, and having an outer periphery, the second end extending through the discharge end of the plunger and terminating downstream of the suction end of the plunger;

a reciprocating motion inducing element connected to the first end of the valve stem by a valve connector for imparting reciprocating movement from the reciprocating motion inducing element to the stem;

a valve seat secured to the plunger downstream of the suction end of the plunger, the seat having an inner periphery, the inner periphery of the seat and the outer periphery of the valve stem defining a first fluid flow area;

a valve plug connected to the stem at its second end, the plug having an outer periphery, the outer periphery of the valve plug and an inner periphery of the plunger defining a second fluid flow area; and at least one displaceable valve ring having an internal and external periphery, the internal periphery of the ring and the outer periphery of the stem defining a third fluid flow area, and the external periphery of the ring and the inner periphery of the plunger defining a fourth fluid flow area;

wherein the first fluid flow area is substantially equal to or smaller than the second fluid flow area, and substantially equal to the sum of the third and fourth fluid flow areas;

wherein the reciprocating movement of the stem opens and closes the valve;

wherein, when the valve is in the open or the closed position, the valve seat, the valve plug and the at least one displaceable valve ring are each positioned downstream of the suction end of the plunger; and wherein when in the open position, the distances: (i) between the valve plug and a last at least one displaceable valve ring adjacent the plug, (ii) between the at least one displaceable valve rings, and (iii) between the valve seat and a first at least one displaceable valve ring adjacent the seat are spaced to maximize fluid flow therethrough while minimizing the pressure drop across the valve.

2. The valve of claim 1, wherein where positioned within the plunger, the cylinder is stationary and the valve is positioned anywhere along the entire length of the plunger.

3. The valve of claim 2, wherein the standing valve of the positive displacement pump is connected to a suction end of the stationary cylinder.

4. The valve of claim 3, wherein the standing valve is a pressure responsive check valve allowing fluid into the chamber during a suction stage and precluding fluid into the chamber during a discharge stage.

5. The valve of claim 3, wherein the standing valve is a minimum pressure drop composite plug retention valve.

6. The valve of claim 5, wherein each of the traveling valve and the standing valve comprise a valve seat, a valve plug and at least one valve ring disposed between the seat and the plug, attaining simultaneous maximum fluid flow therebetween while minimizing pressure drop across the valves.

7. The valve of claim 1, wherein the reciprocating motion inducing element comprises a sucker rod, continuous rod or rod valve.

8. The valve of claim 1, wherein the at least one valve ring comprises two or more valve rings disposed in series.

9. The valve of claim 1, wherein when the at least one displaceable valve ring comprises two or more adjacent valve rings disposed in series, the internal periphery of each of the displaceable valve rings decreases while the external periphery of each of the displaceable valve rings increases as the rings progress from the valve seat toward the valve plug.

10. The valve of claim 1, wherein the at least one ring is disposed between the valve seat and the valve plug.

11. The valve of claim 1, wherein when in the closed position, the distances: (i) between the valve plug and a last valve ring adjacent the plug, (ii) between each of the valve rings, and (iii) between the valve seat and a first valve ring adjacent the seat form a seal preventing fluid flow therethrough.

12. The valve of claim 1, wherein when the valve is in the open position, a minimum separation distance between the valve plug, the at least one displaceable valve rings, and the valve seat is determined from a conical surface that is generated between the overlap of the sealing surfaces of the valve plug and the last at least one displaceable valve ring adjacent the plug, the sealing surfaces between the at least one displaceable valve rings, and the sealing surfaces between the valve seat and the first at least one displaceable valve ring adjacent the seat, respectively.

13. The valve of claim 12, wherein the conical surface that is generated between the overlap of the sealing surfaces of the valve plug and the last at least one valve ring adjacent the plug comprises a large diameter (Dp) and minor diameter (Di), the large diameter corresponding to the outer diameter of the valve plug and the minor diameter corresponding to the inner diameter of the last at least one displacement valve ring adjacent the plug.

14. The valve of claim 12, wherein the conical surface that is generated between the overlap of the sealing surface of the valve seat and the first at least one displaceable valve ring adjacent the valve seat comprises a large diameter (Ds) and a minor diameter (Do), the large diameter corresponding to the outer diameter of the first at least one displaceable valve ring adjacent the seat and the minor diameter corresponding to the inner diameter of the valve seat.

15. The valve of claim 12, wherein the internal periphery of each of the at least one displaceable valve rings forms an annular internal flow area, and wherein a minimum separation distance between each of the at least one displaceable rings is determined by the internal annular flow area of largest at least one displaceable valve ring.

* * * * *